United States Patent
Lee et al.

(10) Patent No.: US 9,817,798 B2
(45) Date of Patent: Nov. 14, 2017

(54) METHOD FOR DISPLAYING INTERNET PAGE AND MOBILE TERMINAL USING THE SAME

(71) Applicant: LG Electronics Inc., Seoul (KR)

(72) Inventors: Sunjung Lee, Seoul (KR); Joowoo Lee, Seoul (KR); Kyunghye Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 737 days.

(21) Appl. No.: 14/312,213

(22) Filed: Jun. 23, 2014

(65) Prior Publication Data

US 2014/0304593 A1  Oct. 9, 2014

Related U.S. Application Data

(63) Continuation of application No. 13/083,707, filed on Apr. 11, 2011, now Pat. No. 8,799,784.

(30) Foreign Application Priority Data

Sep. 17, 2010 (KR) .................. 10-2010-0092018

(51) Int. Cl.
*G06F 3/048* (2013.01)
*G06F 17/22* (2006.01)
*G06F 3/0483* (2013.01)
*G06F 3/0484* (2013.01)
*G06F 17/30* (2006.01)

(52) U.S. Cl.
CPC ........ *G06F 17/2247* (2013.01); *G06F 3/0483* (2013.01); *G06F 3/04842* (2013.01); *G06F 17/30867* (2013.01)

(58) Field of Classification Search
CPC . G06F 17/2247; G06F 3/0483; G06F 3/04842
USPC ....................................................... 715/738
See application file for complete search history.

(56) References Cited

U.S. PATENT DOCUMENTS

| 7,424,510 B2 | 9/2008 | Gross et al. |
| 7,512,880 B2 | 3/2009 | Morris |
| 7,532,196 B2 * | 5/2009 | Hinckley ................ G06F 3/011 345/156 |
| 8,184,066 B2 | 5/2012 | Chung et al. |
| RE43,564 E | 8/2012 | Van Ee |
| 8,286,084 B2 | 10/2012 | Castleman |

(Continued)

FOREIGN PATENT DOCUMENTS

| CN | 1354417 A | 6/2002 |
| CN | 101090451 A | 12/2007 |
| CN | 101802817 A | 8/2010 |

OTHER PUBLICATIONS

Chinese Office Action issued in Application No. 201110197016.2 dated Jul. 23, 2015.

(Continued)

*Primary Examiner* — David Phantana Angkool
(74) *Attorney, Agent, or Firm* — Ked & Associates, LLP

(57) ABSTRACT

Information may be displayed on a mobile terminal by receiving information of a first Internet page, displaying the information on a first screen of a display, designating a first area of the first Internet page displayed on the first screen, and displaying the designated first area of the first Internet page on a second screen of the display.

20 Claims, 5 Drawing Sheets

(56) References Cited

U.S. PATENT DOCUMENTS

| | | | |
|---|---|---|---|
| 9,098,133 B2* | 8/2015 | Gai | G06F 3/041 |
| 9,137,627 B2* | 9/2015 | Gai | G06F 3/03547 |
| 9,261,964 B2* | 2/2016 | Townsend | G06F 3/0416 |
| 9,582,122 B2* | 2/2017 | Bathiche | G06F 3/0488 |
| 2004/0109011 A1* | 6/2004 | Peterson, Jr. | G06F 17/30905 715/700 |
| 2005/0030255 A1* | 2/2005 | Chiu | G06F 3/04883 345/1.3 |
| 2006/0284785 A1 | 12/2006 | Bitterlich | |
| 2008/0055273 A1 | 3/2008 | Forstall | |
| 2009/0249251 A1 | 10/2009 | Eischeid et al. | |
| 2010/0309094 A1 | 12/2010 | Castleman | |
| 2010/0309195 A1* | 12/2010 | Castleman | G06F 3/0481 345/418 |
| 2012/0072847 A1 | 3/2012 | Lee et al. | |

OTHER PUBLICATIONS

European Office Action dated Apr. 21, 2016 issued in Application No. 11161899.7.
Korean Office Action issued in Application No. 10-2010-0092018 dated May 19, 2016.
U.S. Office Action dated Mar. 13, 2013 for parent U.S. Appl. No. 13/083,707.
U.S. Office Action dated Oct. 21, 2013 for parent U.S. Appl. No. 13/083,707.

* cited by examiner

METHOD FOR DISPLAYING INTERNET PAGE AND MOBILE TERMINAL USING THE SAME

CROSS-REFERENCE TO RELATED APPLICATION

This application is a Continuation Application of U.S. application Ser. No. 13/083,707, filed on Apr. 11, 2011, which claims priority from Korean Application No. 10-2010-0092018, filed Sep. 17, 2010, the subject matters of which are hereby incorporated by reference.

BACKGROUND

1. Field

The present disclosure relates to an information display method and, more particularly, to a method for displaying an Internet page and a mobile terminal using the same.

2. Background

Terminals may be divided into a mobile or portable terminal and a stationary terminal based on whether or not the terminals are movable. Mobile terminals may be divided into a handheld terminal and a vehicle mount terminal based on whether or not users can directly carry the terminal.

Terminals may support complicated functions such as capturing images or video, reproducing music or video files, playing games, receiving broadcast signals, and/or the like. By comprehensively and collectively implementing such functions, mobile terminals may be in the form of a multimedia player or device. In order to support and increase functions of the terminals, improvement of structural part(s) and/or software part(s) of terminals may be considered.

As the rate of using various Internet services through wireless communication networks is increasing, terminals are evolving toward allowing a user to conveniently access an Internet page and view corresponding content, beyond a simple Internet site access function.

However, when the user accesses a plurality of Internet pages to access various types of information, each Internet page may be displayed on a separate window or on a separate tab, the user must change the windows and tab one by one to check information, which may cause user inconvenience.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments of the present disclosure may be described below in detail with reference to the accompanying drawings, where those components may be rendered by a same reference number that are the same or are in correspondence, regardless of figure number, and redundant explanations may be omitted. In describing the present disclosure, if a detailed explanation for a related known function or construction is considered to unnecessarily divert from the gist of the present disclosure, such explanation has been omitted but would be understood by those skilled in the art.

In the following description, usage of suffixes such as 'module', 'part' or 'unit' used for referring to elements may be given merely to facilitate explanation of the present disclosure, without having any significant meaning. In describing the present disclosure, if a detailed explanation for a related known function or construction is considered to unnecessarily divert from the gist of the present disclosure, such explanation has been omitted but would be understood by those skilled in the art. The accompanying drawings aim to facilitate understanding of the present disclosure and should not be construed as limited to the accompanying drawings.

Overall Configuration of a Mobile Terminal

The mobile terminal associated with the present disclosure may include mobile phones, smart phones, notebook computers, digital broadcast receivers, Personal Digital Assistants (PDAs), Portable Multimedia Player (PMPs), navigation devices, and/or the like. It would be understood by a person in the art that a configuration according to embodiments of the present disclosure may also be applicable to fixed types of terminals such as digital TVs, desk top computers, and/or the like, except for any elements especially configured for a mobile purpose.

Figure 1:
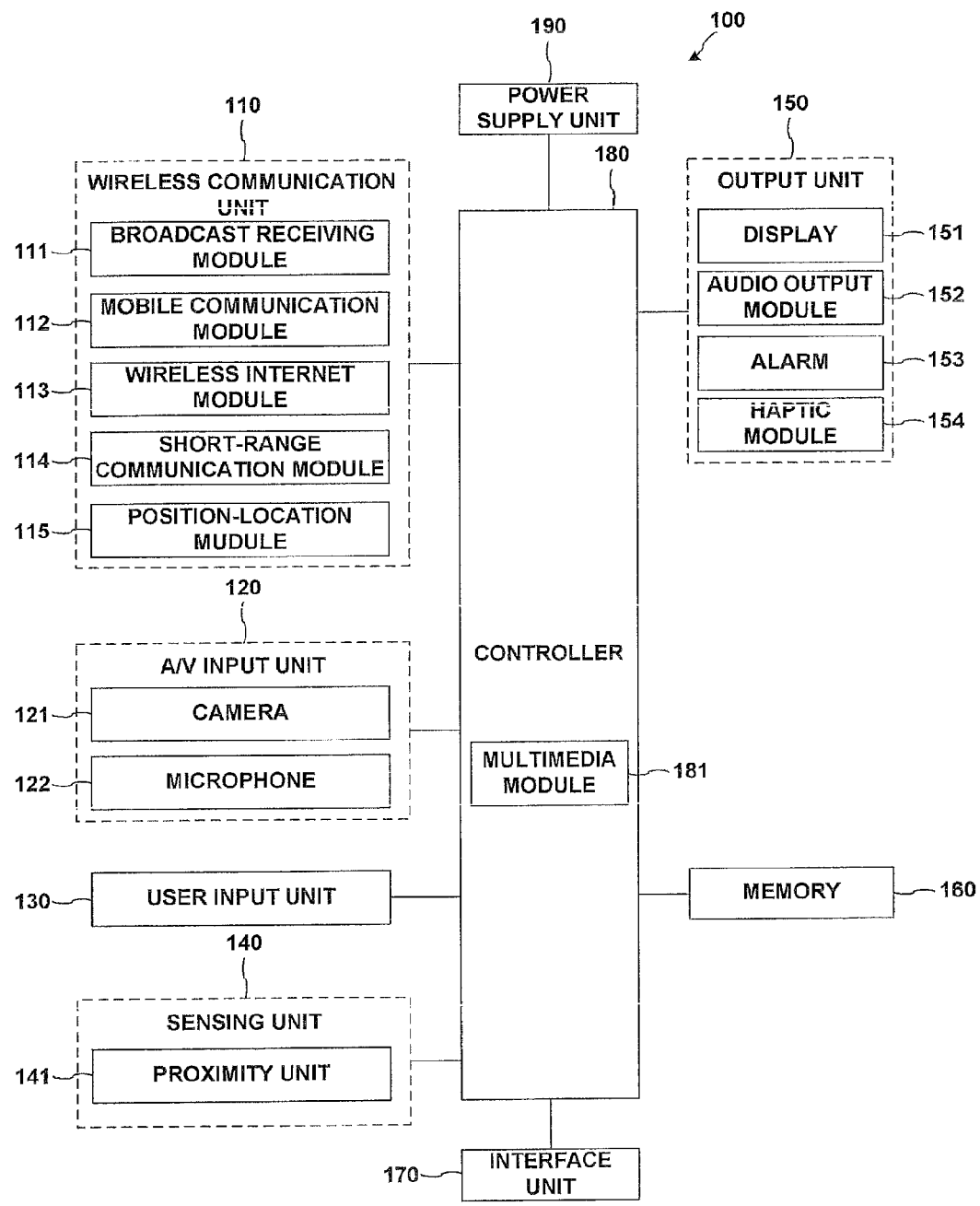
FIG. 1 is a schematic block diagram of a mobile terminal according to an exemplary embodiment.

FIG. 1 is a schematic block diagram of a mobile terminal according to an embodiment of the present disclosure. Other embodiments and configurations may also be provided.

A mobile terminal 100 may include a wireless communication unit 110, an Audio/Video (A/V) input unit 120, a user input unit 130, a sensing unit 140, an output unit 150, a memory 160, an interface unit 170, a controller 180, and a power supply unit 190, and/or the like. FIG. 1 shows the mobile terminal 100 as having various components, although it should be understood that implementing all of the illustrated components is not a requirement. Greater or fewer components may alternatively be implemented.

The wireless communication unit 110 may include one or more components allowing radio communication between the mobile terminal 100 and a wireless communication system or a network in which the mobile terminal 100 is located. For example, the wireless communication unit 110 may include at least one of a broadcast receiving module 111, a mobile communication module 112, a wireless Internet module 113, a short-range communication module 114, and a position-location module 115.

The broadcast receiving module 111 may receive broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network and/or the broadcast associated information may be received by the mobile communication module 112. Broadcast signals and/or broadcast-associated information received via the broadcast receiving module 111 may be stored in the memory 160 (or other type of storage medium).

The mobile communication module 112 may transmit and/or receive radio signals to and/or from at least one of a base station (e.g., access point, Node B, and/or the like), an external terminal (e.g., other user devices) and/or a server (or other network entities). Such radio signals may include a voice call signal, a video call signal or various types of data according to text and/or multimedia message transmission and/or reception.

The wireless Internet module 113 may support wireless Internet access for the mobile terminal 100. This wireless Internet module 113 may be internally or externally coupled to the mobile terminal 100. The implemented wireless Internet access technique may include a WLAN (Wireless LAN) (Wi-Fi), Wibro (Wireless broadband), Wimax (World Interoperability for Microwave Access), HSDPA (High Speed Downlink Packet Access), LTE (Long Term Evolution), LTE-A (Long Term Evolution Advanced) and/or the like.

The short-range communication module 114 may support short range communications. Examples of short-range communication technology may include BLUETOOTH, Radio Frequency IDentification (RFID), Infrared Data Association (IrDA), Ultra-WideBand (UWB), ZIGBEE, and/or the like.

The position-location module 115 may check or acquire a location (or position) of the mobile terminal 100. One example of the position-location module 115 is a Global Positioning System (GPS).

The NV input unit 120 may receive an audio or image signal. The A/V input unit 120 may include a camera 121 (or other image capture device) or a microphone 122 (or other sound pick-up device). The camera 121 may process image frames of still pictures or video obtained by an image capture device in a video capturing mode or an image capturing mode. The processed image frames may be displayed on a display 151 (or display unit) or other visual output device.

The image frames processed by the camera 121 may be stored in the memory 160 (or other storage medium) or transmitted via the wireless communication unit 110. Two or more cameras 121 may be provided according to configuration of the mobile terminal 100.

The microphone 122 may receive sounds (audible data) via a microphone (and/or the like) in a phone call mode, a recording mode, a voice recognition mode, and/or the like, and may process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal 100. The user input unit 130 may include a keypad, a dome switch, a touch pad (e.g., a touch sensitive member that detects changes in resistance, pressure, capacitance, and/or the like due to being contacted), a jog wheel, a jog switch, and/or the like.

The sensing unit 140 (or other detection means) may detect a current status (or state) of the mobile terminal 100 such as an opened state or a closed state of the mobile terminal 100, a location of the mobile terminal 100, a presence or an absence of user contact with the mobile terminal 100 (i.e., touch inputs), orientation of the mobile terminal 100, an acceleration or deceleration movement and direction of the mobile terminal 100, and/or the like, and may generate commands or signals for controlling an operation of the mobile terminal 100. For example, when the mobile terminal 100 is implemented as a slide type mobile phone, the sensing unit 140 may sense whether the slide phone is opened or closed. The sensing unit 140 may also detect whether or not the power supply unit 190 supplies power or whether or not the interface unit 170 is coupled with an external device. The sensing unit 140 may include a proximity unit 141.

The output unit 150 may provide outputs in a visual, audible, and/or tactile manner (e.g., audio signal, image signal, alarm signal, vibration signal, etc.). The output unit 150 may include the display 151, an audio output module 152, an alarm 153, a haptic module 154, and/or the like.

The display 151 may display (output) information processed in the mobile terminal 100. For example, when the mobile terminal 100 is in a phone call mode, the display 151 may display a User Interface (UI) or a Graphic User Interface (GUI) associated with a call or other communication (such as text messaging, multimedia file downloading, and/or the like). When the mobile terminal 100 is in a video call mode or an image capturing mode, the display 151 may display a captured image and/or received image, a UI or GUI that shows videos or images and functions related thereto, and/or the like.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, an e-ink display, and/or the like.

Some of the displays may be transparent or light-transmissive to allow viewing of an exterior, which may be called transparent displays. A transparent display may be a Transparent Organic Light Emitting Diode (TOLED) display, and/or the like, for example. Through such configuration, the user can view an object positioned at a rear side of the terminal body through a region occupied by the display 151 of the terminal body.

The mobile terminal 100 may include two or more displays (or other display means) according to its particular desired embodiment. For example, a plurality of displays may be separately or integrally provided on one surface of the mobile terminal 100, or may be separately provided on mutually different surfaces.

When the display 151 and a sensor (hereafter referred to as a touch sensor) for detecting a touch operation are overlaid in a layered manner to form a touch screen, the display 151 may function as both an input device and an output device. The touch sensor may have a form of a touch film, a touch sheet, a touch pad, and/or the like.

The touch sensor may convert pressure applied to a particular portion of the display 151 or a change in capacitance and/or the like generated at a particular portion of the display 151 into an electrical input signal. The touch sensor may detect pressure when a touch is applied, as well as the touched position and area.

When there is a touch input with respect to the touch sensor, a corresponding signal (signals) may be transmitted to a touch controller. The touch controller may process the signals and transmit corresponding data to the controller 180. Accordingly, the controller 180 may recognize which portion of the display 151 has been touched.

A proximity unit 141 may be provided within or near the touch screen. The proximity unit 141 may be a sensor for detecting presence or absence of an object relative to a certain detection surface or an object that exists nearby by using a force of electromagnetism or infrared rays without a physical contact. Thus, the proximity unit 141 may have a considerably longer life span compared with a contact type sensor, and the proximity unit 141 may be utilized for various purposes.

Examples of the proximity unit 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and/or the like. In an example where the touch screen is the capacitance type, proximity of the pointer may be detected by a change in electric field based on the proximity of the pointer. The touch screen (touch sensor) may be classified as a proximity unit.

The audio output module 152 may convert and output sound audio data received from the wireless communication unit 110 or stored in the memory 160 in a call signal reception mode, a call mode, a record mode, a voice recognition mode, a broadcast reception mode, and/or the like. The audio output module 152 may provide audible outputs related to a particular function performed by the mobile terminal 100 (e.g., a call signal reception sound, a message reception sound, etc.). The audio output module 152 may include a receiver, a speaker, a buzzer, and/or other sound generating device.

The alarm 153 (or other type of user notification means) may provide outputs to inform about an occurrence of an event of the mobile terminal 100. Events may include call reception, message reception, key signal inputs, a touch input, etc. In addition to audio or video outputs, the alarm 153 may provide outputs in a different manner to inform about an occurrence of an event. For example, the alarm 153 may provide an output in the form of vibrations (or other tactile or sensible outputs). When a call, a message, and/or some other incoming communication is received, the alarm 153 may provide tactile outputs (i.e., vibrations) to inform the user thereof. By providing such tactile outputs, the user can recognize an occurrence of various events even if his mobile phone is in the user's pocket. Outputs informing about an occurrence of an event may also be provided via the display 151 or the audio output module 152. The display 151 and the audio output module 152 may be classified as a part of the alarm 153.

The haptic module 154 may generate various tactile effects that the user may feel. An example of the tactile effects generated by the haptic module 154 is vibration. Strength and pattern of the haptic module 154 may be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, and/or the like, an effect by reproducing a sense of cold and warmth using an element that can absorb or generate heat.

The haptic module 154 may allow the user to feel a tactile effect through a muscle sensation such as fingers or arm of the user, as well as transferring the tactile effect through a direct contact. Two or more haptic modules 154 may be provided according to configuration of the mobile terminal 100.

The memory 160 may store software programs used for processing and controlling operations performed by the controller 180, and/or may temporarily store data (e.g., a phonebook, messages, still images, video, etc.) that are inputted or outputted. Additionally, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and/or an optical disk. The mobile terminal 100 may operate in relation to a web storage device that performs a storage function of the memory 160 over the Internet.

The interface unit 170 may serve as an interface with every external device connected with the mobile terminal 100. For example, the external devices may transmit data to an external device, receive and transmit power to each element of the mobile terminal 100, and/or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, and/or the like.

The identification module may be a chip that stores various information for authenticating an authority of person using the mobile terminal 100 and may include a user identity module (UIM), a subscriber identity module (SIM), a universal subscriber identity module (USIM), and/or the like. Additionally, the device having the identification module (hereafter referred to as an identifying device) may take the form of a smart card. Accordingly, the identifying device may be connected with the mobile terminal 100 via a port.

When the mobile terminal 100 is connected with an external cradle, the interface unit 170 may serve as a passage to allow power from the cradle to be supplied therethrough to the mobile terminal 100 and/or may serve as a passage to allow various command signals inputted by the user from the cradle to be transferred to the mobile terminal 100 therethrough. Various command signals or power inputted from the cradle may operate as signals for recognizing that the mobile terminal 100 is properly mounted on the cradle.

The controller 180 may control general operations of the mobile terminal 100. For example, the controller 180 may perform controlling and processing associated with voice calls, data communications, video calls, and/or the like. The controller 180 may include a multimedia module 181 for reproducing multimedia data. The multimedia module 181 may be configured within the controller 180 and/or may be configured to be separated from the controller 180.

The controller 180 may perform a pattern recognition processing to recognize a handwriting input or a picture drawing input performed on the touch screen as characters or images, respectively.

The power supply unit 190 may receive external power or internal power and may supply appropriate power required for operating respective elements and components under control of the controller 180.

Various embodiments described herein may be implemented in a computer-readable or its similar medium using, for example, software, hardware, and/or any combination thereof.

For hardware implementation, embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electronic units designed to perform functions described herein. Such embodiments may be implemented by the controller 180 itself.

For software implementation, embodiments (such as procedures or functions described herein) may be implemented by separate software modules. Each software module may perform one or more functions or operations described herein. Software codes may be implemented by a software application written in any suitable programming language. The software codes may be stored in the memory 160 and executed by the controller 180.

Method for Processing User Input with Respect to Mobile Terminal

The user input units 130 may be manipulated to receive a command for controlling operation of the mobile terminal 100 and may include a plurality of manipulation units 131 and 132. The manipulation units 131 and 132 may be referred to as a manipulating portion, and various methods and techniques can be employed for the manipulation portion as long as they can be operated by the user in a tactile manner.

The display 151 can display various types of visual information. The information may be displayed in the form of characters, numerals, symbols, graphic and/or icons. In order to input such information, at least one of the characters, numerals, symbols, graphic and icons may be displayed in predetermined arrangement in the form of a keypad. The keypad may be referred to as a 'soft key'.

The display 151 may operate as an entire area or may be divided into a plurality of regions so as to be operated. The plurality of regions may operate in association with each other.

For example, an output window and an input window may be displayed at an upper portion and a lower portion of the display 151. The output window and the input window are regions allocated to output or input information, respectively. Soft keys marked by numbers for inputting a phone number and/or the like may be outputted to the input window (or may be displayed on the input window). When a soft key is touched, a number and/or the like corresponding to the touched soft key may be displayed on the output window. When the manipulation unit is manipulated, a call connection to the phone number displayed on the output window may be attempted or text displayed on the output window may be inputted to an application.

The display 151 or a touch pad may be configured to receive a touch through scrolling. The user may move an entity displayed on the display 151 (e.g. a cursor or a pointer positioned on an icon and/or the like) by scrolling the touch pad. Additionally, when the user moves his finger on the display 151 or on the touch pad, a path along which the user's finger moves may be visually displayed on the display 151. This may be useful in editing an image displayed on the display 151.

A certain function of the mobile terminal 100 may be executed when the display 151 (touch screen) and the touch pad are touched together within a certain time range. For example, the display 151 and the touch pad may be touched together when the user clamps the terminal body by using his thumb and index fingers. The certain function may be activation or deactivation of the display 151 and/or the touch pad.

Exemplary embodiments related to a control method that may be implemented in the mobile terminal configured as described above may now be described with reference to the accompanying drawings. The exemplary embodiments to be described may be solely used or may be combined to be used. Also, exemplary embodiments to be described may be combined with the foregoing user interface (UI) so as to be used.

Method for Displaying Internet Page and Mobile Terminal Using the Same

According to a method for displaying an Internet page according to an exemplary embodiment, partial content of each of a plurality of Internet pages may be selectively displayed on one screen (hereafter referred to as a user defined screen) to allow a user to easily recognize a plurality of types of information on a single user defined screen.

The screen area of the user defined screen on which the content of each of the Internet pages is displayed may change in its position and/or its size. Content displayed on each screen area of the user defined screen may be updated periodically or according to Internet page re-accessing based on a user instruction (i.e., an input signal).

The mobile terminal 100 may execute a predetermined function according to a user instruction (input signal) on the screen area. For example, when a particular screen area is touched, the mobile terminal 100 may display entire content of a corresponding Internet page in a separate tab, and may perform a bookmark similarity function activating the tab.

Thus, according to a method for displaying an Internet page, the user may select only his or her desired content from a plurality of Internet pages and conveniently view the content on a single screen.

Content displayed on a screen may be periodically or intermittently updated, and the user may adjust a screen area on which each content is displayed such that the screen area may be provided at a user desired position or the screen area may have a user desired size, thus allowing the user to more conveniently use an Internet service.

The wireless communication unit 110 may access all Internet page. The wireless communication unit 110 may receive information (such as source data of the Internet page) that may be used for reproducing the Internet page on the mobile terminal, from the accessed Internet page.

The display 151 may display an entirety or a portion of content of the Internet page accessed by the wireless communication unit 110. A 'screen' may refer to an entirety or a portion of an image displayed on the display 151, as the display 151 visually displays image data or graphic data at one point in time or a "screen" may refer to a display surface of the display 151 on which the implemented image is displayed.

The display 151 may display a plurality of Internet pages on one screen or on a plurality of screens. For example, the display 151 may display a plurality of Internet pages in the form of divided screens on a single screen.

The display 151 may display a first Internet page on a first screen or change to a second screen to display a second Internet page on the second screen based on a control command from the controller 180. The display 151 may display a first Internet page on the screen, remove the first Internet page from the screen, and display the second Internet page on the screen.

The first and second screens may be different windows, respective divided screens coexisting on a single large screen, and/or may be respective tabs in case of generating a plurality of tabs within a single window and displaying an object in each tab. The first and second screens may be simultaneously displayed on the display 151 and/or may be displayed at different points in time.

The controller 180 may transmit a control command to the display 151 to display the first Internet page on the first screen. The controller 180 may designate a first area of the first Internet page displayed on the first screen and display the designated first area on the second screen. The second screen may be the foregoing user defined screen.

The controller 180 may transmit a control command to the display 151 to display the second Internet page on a third screen. The controller 180 may designate a second area of the second Internet page displayed on the third screen and display the designated second area along with the first area on the second screen (i.e., the user defined screen).

The controller 180 may display the first area and the second area in the form of thumbnails having a same size on the second screen (i.e., the user defined screen), and/or may display the first area and the second area on the second screen (i.e., the user defined screen) such that they have a same size and are placed at positions set according to a user input signal. Examples of thumbnails (or thumbnail images) may be described in U.S. application Ser. No. 12/651,730, filed Jan. 4, 2010, the subject matter of which is incorporated herein by reference.

Operations or functions of the mobile terminal 100 may be divided into a registration of content of an Internet page to be displayed on the user defined screen, a method for displaying a user defined screen or a method for executing a function, and an adjustment of screen areas on which content of each of Internet pages is displayed. The registration of content of an Internet page to be displayed on the user defined screen may now be described.

Registration of Content of Internet Page to be Displayed on User Defined Screen

As discussed above, the controller 180 may designate an area of an Internet page to be displayed on the screen and display the designated area on the user defined screen. This process may be understood as a process of registering content of an Internet page to be displayed on the user defined screen.

Figure 2:
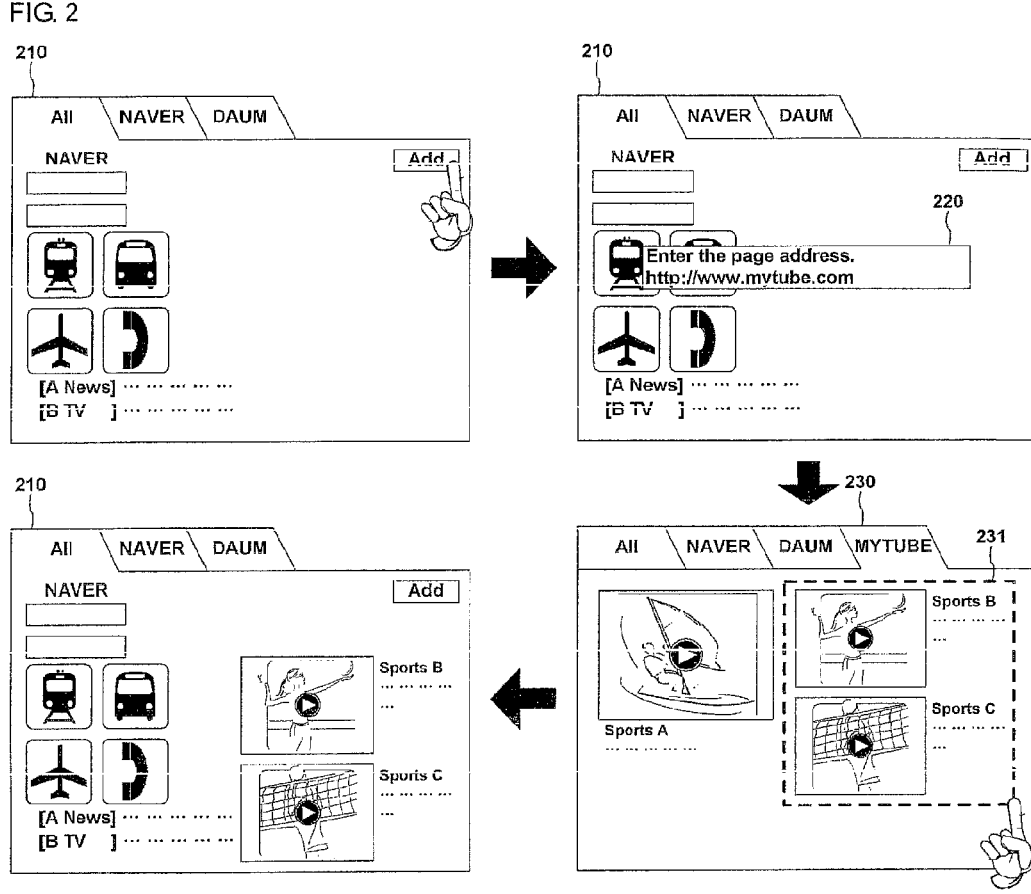
FIG. 2 are overviews of screen displays showing displaying an area designated from an Internet page on a user defined screen by a mobile terminal according to an exemplary embodiment.

FIG. 2 are overviews of screen displays showing displaying an area designated from an Internet page on a user defined screen by a mobile terminal according to an exemplary embodiment. Other embodiments and configurations may also be provided.

As shown in FIG. 2, when a user selects a function menu (e.g., 'Add' button) for adding a screen area from a user defined screen 210, the mobile terminal 100 may display a window 220 for inputting a URL of an Internet page to be added.

When the inputting of the URL is completed, the mobile terminal 100 may access the target Internet page and display the accessed Internet page 230. When the user selects content, an area, and/or a portion 231 to be displayed on the user defined screen from the Internet page, the mobile terminal 100 may display the selected content on the user defined screen 210.

The mobile terminal 100 may adjust a size or a position of the area on which the selected content is to be displayed, based on a predetermined basic setting or based on a user input signal. For example, as shown in FIG. 2, the mobile terminal 100 may display the selected content at a position where the selected content does not overlap with another screen area being currently displayed on the user defined screen based on a predetermined basic setting.

The mobile terminal 100 may display an area designated from the Internet page on the user defined screen in various manners other than the method described above with reference to FIG. 2.

For example, when the user selects a function for adding a screen area from the user defined screen 210, the mobile terminal 100 may display a predetermined Internet page list or an Internet page list decided based on a user's Internet access history. For example, the mobile terminal 100 may display a list of Internet pages that have not been registered to the user defined screen (i.e., that have not been displayed on the user defined screen) from among Internet pages having a high access frequency in consideration of access frequency of each Internet page.

When an Internet page included in the list provides supplementary information in response to a user's query, the mobile terminal 100 may display an additional Internet page list with respect to the corresponding Internet page. For example, as for an Internet page providing a search function, the mobile terminal 100 may additionally display a list of the most searched Internet pages through the corresponding Internet page, so that the user may select one or more Internet pages. The mobile terminal 100 may display a list of popular search words of the corresponding Internet page, a list of relevant Internet pages with respect to a particular search word, and a list of Internet pages including a largest number of comments.

When at least one of the Internet pages included in the list is selected, the mobile terminal 100 may access the target Internet page and display the accessed Internet page. When the user selects content, an area, and/or a portion to be displayed on the user defined screen from the Internet page, the mobile terminal 100 may display the selected content on the user defined screen.

The mobile terminal 100 may display a function menu for registering (or displaying) the content, the area, and/or the portion of the currently accessed Internet page to (or on) the user defined screen, and when there is a user selection of the corresponding function menu, the mobile terminal 100 may display the selected content on the user defined screen in a similar manner as described above.

The controller 180 may designate the content, the area, and/or the portion to be displayed on the user defined screen in various other manners.

For example, the controller 180 may designate an interior of a polygon having coordinates where a touch input signal is received as apexes on the screen on which an Internet page is displayed, and/or as an area to be displayed on the user defined screen. When the user performs touch-and-dragging to the right and downward on the screen of the Internet page, the controller 180 may designate an interior of a quadrangle, of which a start point of the tough-and-dragging is a left upper end apex and an end point of the touch-and-dragging is a right lower end apex, as the area to be displayed on the user defined screen.

When the user performs a touch input to three or more coordinates on the screen of the Internet page, the controller 180 may designate an internal area of the polygon having the coordinates as the apexes as the area to be displayed on the user defined screen. Alternatively, the controller 180 may designate an internal area of a looped curve touch-inputted on the screen of the Internet page by the user. The controller 180 may also designate an internal area of a quadrangular based on line inputs designating four sides, as the area to be displayed on the user defined screen.

The controller 180 may change a position or a size of the content, the area, and/or the portion as designated. The controller 180 may magnify, reduce, and/or shift the designated area. For example, when the user performs inputting in a drag manner, starting from the apex or one side of the designated area, the controller 180 may magnify or reduce the designated area. When the user performs touch-and-dragging within the designated area, the controller 180 may shift the designated area.

A method for displaying the user defined screen or the method for executing a function may now be described.

Method for Displaying User Defined Screen or Method for Executing Function

As discussed above, the controller 180 may display an accessed Internet page on the first screen. The controller 180 may acquire content of the Internet page corresponding to the first area designated in the first screen or acquire a screen image of the designated first area and display the same on the second screen (i.e., the user defined screen).

The controller 180 may acquire content to be displayed on the user defined screen from the Internet page corresponding to the content through the wireless communication unit 110.

For example, when the wireless communication unit 110 receives the entire Internet page, the controller 180 may analyze the corresponding Internet page created according to the format (such as XML, HTML, and/or the like) to recognize the overall layout (a frame, a table, and/or the like) of the Internet page, and determine an uppermost URL corresponding to the content selected by the user. The uppermost URL may refer to a URL that is common for all the items included in the content, the area, and/or the portion selected by the user. The controller 180 may access the Internet page corresponding to the uppermost URL and acquire the content to be displayed within the user defined screen.

When the wireless communication unit 110 receives the entire Internet page, the controller 180 may store pixel coordinates of an area selected by the user from the corresponding Internet page, access the corresponding Internet page, retrieve a captured image corresponding to the area, and display the captured image on the user defined screen.

The controller 180 may display a plurality of screen areas designated from a plurality of Internet pages on the user defined screen. The controller 180 may display the plurality of screen areas on the user defined screen such that they have a size adjusted according to a user input signal or such that they are displayed in the form of thumbnails adjusted to have a same size. The controller 180 may change the display method between a user designated form and the thumbnail form based on a user input signal.

As discussed above, the controller 180 may designate a first area (content or a portion) to be displayed on the user defined screen from the first screen, change the current screen to the second screen (i.e., the user defined screen), and display the first area on the second screen (i.e., the user defined screen). The controller 180 may adjust a position or a size of the first area such that the first area can be displayed without overlapping with content of the already displayed Internet page (e.g., the second area designated from the corresponding Internet page). The size of the first area may be magnified or reduced, or content included in the first area may be magnified or reduced when displayed. The second area may be designated from the same Internet page including the first area or may be designated from a different Internet page.

The controller 180 may display the first area on one of the screen areas previously demarcated on the second screen (i.e., the user defined screen). For example, the controller 180 may demarcate the screen areas of the user defined screen based on a predetermined style sheet or format, and display content of the Internet page on one of the demarcated screen areas.

When the user selects an empty demarcated area, the controller 180 may display content of the Internet page on the selected area. When the user selects a demarcated area already occupied by content of a different Internet page, the controller 180 may shift existing content to a different empty demarcated area and display the additional content of the Internet page on the user selected demarcated area.

Figure 3:
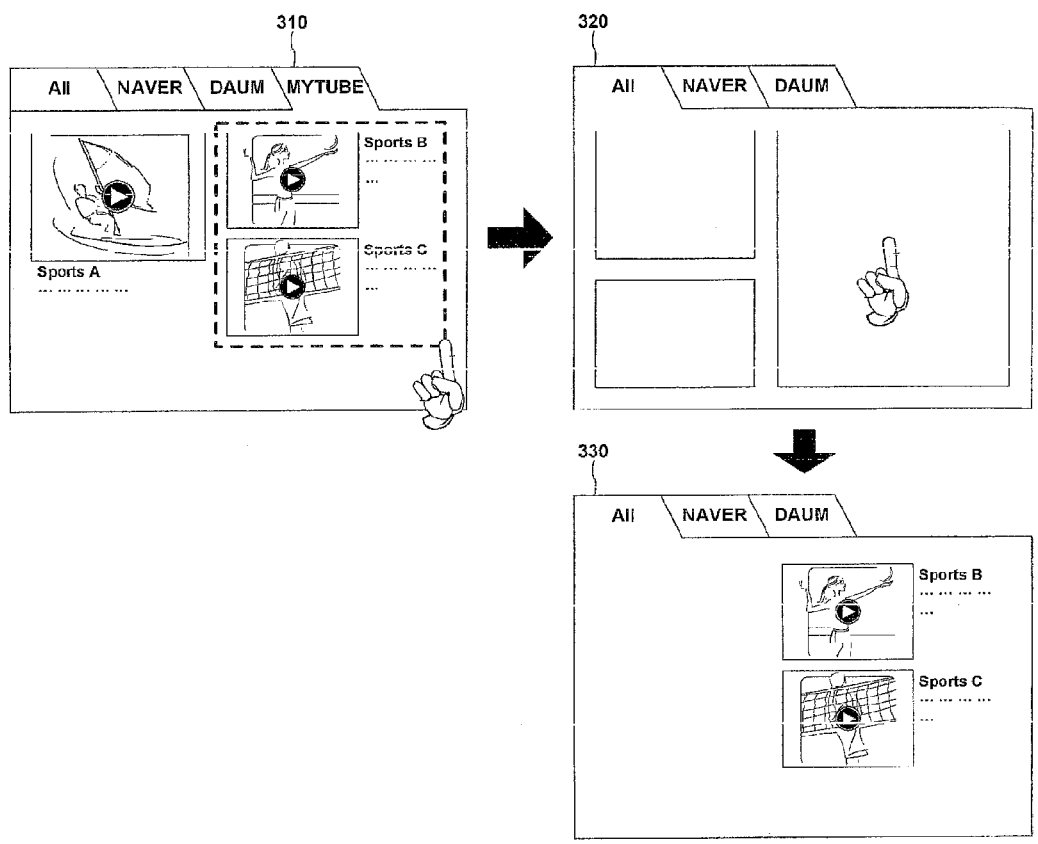
FIG. 3 are overviews of screen displays showing displaying content of an Internet page on a previously demarcated screen area of a user defined screen by a mobile terminal according to an exemplary embodiment.

FIG. 3 are overviews of screen displays showing displaying content of an Internet page on a previously demarcated screen area of a user defined screen by a mobile terminal according to an exemplary embodiment. Other embodiments and configurations may also be provided.

As shown in FIG. 3, when content or an area of an Internet page to be displayed on the user defined screen is designated as shown in screen 310, the mobile terminal 100 displays the user defined screen including previously demarcated screen areas 320. When the user selects a particular screen area from the screen, the mobile terminal 100 displays the designated content or area of the Internet page on the selected screen area 330. The controller 180 may adjust the size of the designated content or the area of the Internet page to fit the size of the selected screen area such that the content or the area is magnified or reduced.

The content (screen area) of the Internet page displayed on the user defined screen may be updated periodically or based on a user input signal. The wireless communication unit 110 may re-access an Internet page corresponding to the content included in the designated area of the Internet page based on a control command from the controller 180. The controller 180 may re-acquire the content included in the designated area through the wireless communication unit 110, update the designated area displayed on the user defined screen, and display the same.

The controller 180 may classify the content displayed on the user defined screen and display the same. For example, the controller 180 may generate a plurality of user defined screens, classify contents or areas designated from the respective Internet pages by category and display them on different user defined screens. The controller 180 may also display a graphic object (e.g., an icon) indicating a folder (a directory, a category, and/or the like) on the user defined screen, and when a user input signal with respect to the graphic object is received, the controller 180 may display content of an Internet page included in the folder like the foregoing user defined screen.

There may be various display methods and function execution methods of the user defined screen corresponding to a user input signal or a user action. For example, when content or an area of an Internet page is added to the user defined screen, the controller 180 may generate a tab for the corresponding Internet page and display an entirety of the corresponding Internet page in the generated tab.

When a user input signal is received on a particular screen area on which the content of the Internet page is displayed on the user defined screen, the controller 180 may generate a tab, activate the tab, and display the entirety of the corresponding Internet page on the tab. For example, when the user completes a log-in procedure in the Internet page displayed on the user defined screen, the controller 180 may display the Internet page in a separate tab and activate the tab.

When the user executes searching in the Internet page displayed on the user defined screen, the controller 180 may display a search keyword, a search history, a search result, and/or the like in a separate tab.

The controller 180 may additionally display a graphic object on the user defined screen based on a user input signal. The controller 180 may add text (memo, speech balloon, and/or the like), an icon, an image, video, and/or the like to the user defined screen. The controller 180 may store the graphic object-added user defined screen in the form of an electronic document based on a format such as XML, HTML, PDF, and/or the like.

The wireless communication unit 110 may transmit the user defined screen to a remote area. For example, the wireless communication unit 110 may transmit data such as characters, numbers, symbols, icons, images, video, and/or the like constituting the user defined screen to a different terminal or a server of a remote area. The data may be the user defined screen data itself such as a captured image, and/or may be information (such as a URL list, position and size information of the screen area, and/or the like) that can be used for reproducing the same user defined screen at the remote area.

The controller 180 may store the user defined screen in the form of an electronic document according to a format (such as XML, HTML, PDF, and/or the like), and the wireless communication unit 110 may transmit the electronic document to the remote area. This function may have a similar effect to publishing an article created by the user.

Adjustment of a screen area on which content of each of the plurality of Internet pages is displayed in the user defined screen may now be described.

Adjustment of Screen Area on which Content of Each of the Plurality of Internet Pages is Displayed in the User Defined Screen The controller 180 may adjust position or size of the content or the area of the Internet page displayed on the user defined screen.

Figure 4:
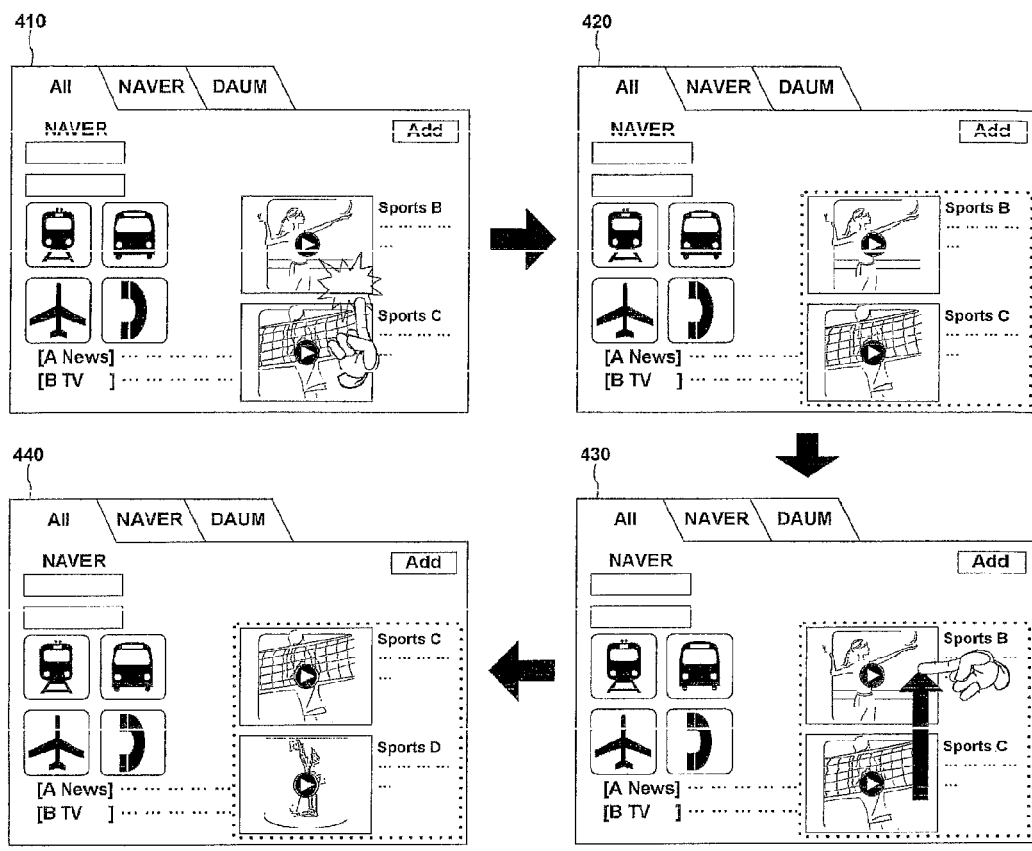
FIG. 4 are overviews of screen displays showing adjusting a position or a size of a screen area on which content of an Internet page is displayed on a user defined screen by a mobile terminal according to an exemplary embodiment.

FIG. 4 are overviews of screen displays showing adjusting position or size of a screen area on which content of an Internet page is displayed on a user defined screen by a mobile terminal according to an exemplary embodiment. Other embodiments and configurations may also be provided.

As shown in FIG. 4, when a long-touch (press & hold) input is received at a particular screen area of the user defined screen on which content of the Internet page is displayed as shown in screen 410, the mobile terminal 100 discriminately or differentially displays the long-touch input-received screen area such that it is in an editing mode as shown in screen 420. For example, as shown in FIG. 4, the mobile terminal 100 may frame the screen area in the editing mode. The mobile terminal 100 may discriminately display the screen area in the editing mode through highlighting, shading, coloring, arrow indicating, icon indicating, and/or the like.

The mobile terminal 100 may change a portion of content to be displayed on the screen area in the Internet page as shown in screen 440 based on a drag input signal in the screen area in the editing mode as shown in screen 430.

The mobile terminal 100 can adjust position or size of the screen area on the user defined screen in manners other than the method described above with reference to FIG. 4.

For example, when the user selects an edge of the screen area and drags it, the mobile terminal 100 may increase or decrease the size of the screen area. When the size of the screen area changes, the mobile terminal 100 may magnify or reduce the content of the Internet page displayed on the screen area in a corresponding ratio and display it, and/or may add or reduce an amount of the content of the Internet page and display it.

When the user selects a screen area and drags the screen area, the mobile terminal 100 may change the position of the screen area. The mobile terminal 100 may display a scale mark so that when the user adjusts size or position of the screen area, the size of the position of the screen area can be automatically adjusted based on an adjacent scale mark.

The mobile terminal 100 may change position and size of another screen area correspondingly based on a change in position and size of one screen area. For example, when screen areas overlap with each other based on a change in position or size of a screen area, the mobile terminal 100 may adjust the screen area such that they do not overlap each other.

Figure 5:
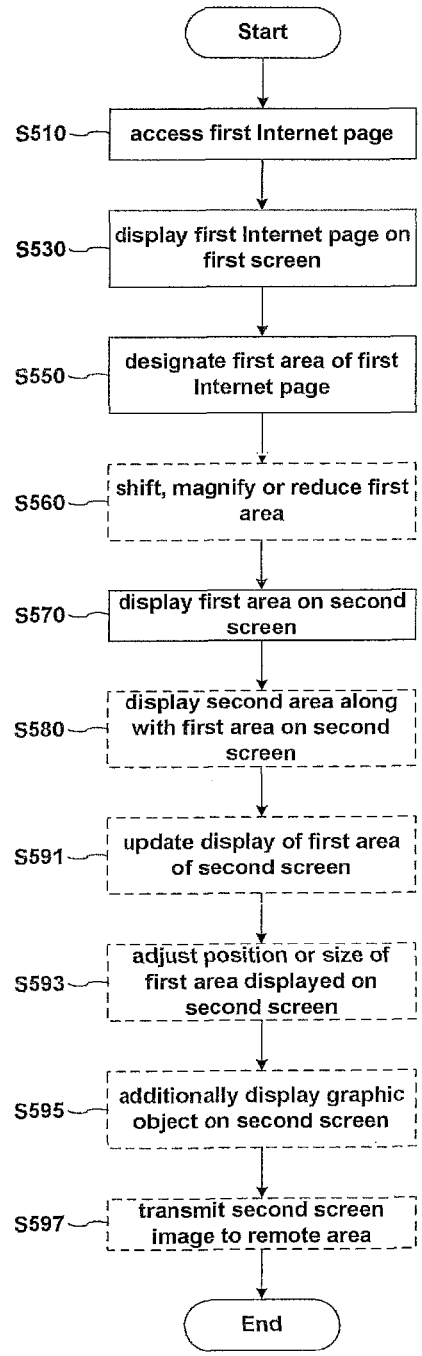
FIG. 5 is a flow chart showing a method for displaying an Internet page according to an exemplary embodiment.

FIG. 5 is a flow chart illustrating a method for displaying an Internet page according to an exemplary embodiment. Other operations, orders of operations and embodiments may also be provided.

With reference to FIG. 5, the mobile terminal 100 may access a first Internet page (operation S510). The mobile terminal 100 may display the accessed first Internet page on a first screen (operation S530).

The mobile terminal 100 may designate a first area of the first Internet page displayed on the first screen (operation S530). The mobile terminal 100 may designate an interior of a polygon as a first area, where the polygon has coordinates where a touch input signal is generated on the first screen as the apexes. After the first area is designated, the mobile terminal 100 may shift, magnify, and/or reduce the designated first area (operation S560).

The mobile terminal 100 may display the designated first area on a second screen (operation S570). In particular, after the mobile terminal 100 changes a current screen to the second screen, it may display the designated first area on the second screen. The mobile terminal 100 may acquire content of an Internet page corresponding to the designated first area or acquire a screen image of the designated first area, and display the same on the second screen.

The mobile terminal 100 may display the first area on one of previously demarcated screen areas of the second screen image.

The mobile terminal 100 may display a second area designated with respect to the first Internet page or a different second Internet page on the second screen, together with the first area.

The mobile terminal 100 may display the designated first area on the second screen such that it does not overlap with the second area displayed on the second screen.

The mobile terminal 100 may display the first area and the second area in the form of thumbnails having a same size on the second screen.

The mobile terminal 100 may access the Internet page corresponding to content included in the first area and update the display of the first area on the second screen (operation S591). The mobile terminal 100 may adjust position or size of the first area displayed on the second screen (operation S593). The mobile terminal 100 may additionally display a corresponding graphic object on the second screen based on a received input signal (operation S595). The mobile terminal 100 may transmit the second screen to a remote area.

An embodiment of the present disclosure may provide a mobile terminal having an input method that is different from disadvantageous mobile terminals.

Another embodiment of the present disclosure may provide a method for displaying an Internet page capable of allowing a user to conveniently view a plurality of Internet pages on one screen and a mobile terminal using the same.

A method for displaying an Internet page may include accessing a first Internet page, displaying the accessed first Internet page on a first screen, designating a first area of the first Internet page displayed on the first screen, and displaying the designated first area on a second screen.

The method may further include displaying a second area designated for a second Internet page along with the first area on the second screen.

When displaying the designated first area on the second screen, content of an Internet page corresponding to the first area may be acquired or a screen image of the designated first area may be acquired and displayed on the second screen.

The method may further include adjusting a position or a size of the first area displayed on the second screen.

A mobile terminal may include a display unit, a wireless communication unit accessing a first Internet page, and a controller displaying the accessed first Internet page on a first screen, designating a first area of the first Internet page displayed on the first screen, and displaying the designated first area on a second screen.

Partial content of each of a plurality of Internet pages may be selectively displayed on one screen, so a user may easily recognize a plurality of types of information from a single user defined screen.

The above-described method may be implemented as codes that can be read by a processor in a program-recorded medium. The processor-readable medium may include a ROM, a RAM, a CD-ROM, a magnetic tape, a floppy disk, an optical data storage device, and/or the like. The processor-readable medium may also include implementations in the form of carrier waves or signals (e.g., transmission via the Internet).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
    a wireless communication unit capable of receiving information of an Internet page;
    a touch screen capable of displaying a first window comprising the Internet page; and
    a controller capable of:
        designating a first area of the Internet page based on a touch input applied on the touch screen on which the Internet page is displayed, wherein an image corresponding to the first area of the Internet page is captured and a URL (Uniform Resource Locator) related to the image is determined based on the designation of the first area of the Internet page;
        displaying a second window on the touch screen which is different from the first window, and the second window comprises a plurality of screen areas divided based on a predetermined format, and the second window includes a screen area in which the image is displayed, wherein a size of the image on the screen area is magnified or reduced to fit a size of the screen area; and
        executing a function to access an Internet page corresponding to the URL when a control command is received via the touch screen displaying the image, and wherein the Internet page corresponding to the URL is displayed on the touch screen by executing the function.

2. The mobile terminal of claim 1, wherein one or more other images, each corresponding to one or more other designated area of at least one another Internet pages, is displayed on one or more other screen areas, and
    wherein the one or more other screen areas is different from the screen area and comprised in the second window.

3. The mobile terminal of claim 2, wherein the image and the one or more other images are displayed on the second window without overlapping each other.

4. The mobile terminal of claim 1, wherein the URL is a common URL for all items included in a content corresponding to the image selected by the touch input.

5. The mobile terminal of claim 4, wherein the URL is an uppermost URL corresponding to the content.

6. The mobile terminal of claim 1, wherein the touch input for designating the first area of the Internet page is a drag touch input.

7. The mobile terminal of claim 6, wherein the controller designate an inner part of a quadrangle defined by the drag touch input as the first area of the Internet page, and
    wherein the quadrangle comprises a left upper end apex corresponding to a start point of the drag touch input and a right lower end apex corresponding to an end point of the drag touch input.

8. The mobile terminal of claim 1, wherein the Internet page corresponding to the URL is displayed on the touch screen via a new window of the touch screen.

9. The mobile terminal of claim 1, wherein information comprising the image is stored in a format of an electronic document.

10. The mobile terminal of claim 9, wherein the format of the electronic document is one of XML, HTML and PDF.

11. The mobile terminal of claim 9, wherein the electronic document corresponding to the information comprising the image is transmitted to a different terminal.

12. The mobile terminal of claim 1, wherein memo or text is added to associate with the image based on a user input.

13. A method for controlling a mobile terminal, the method comprising:
receiving, at a wireless communication unit, information of an Internet page;
displaying, on a touch screen, a first window comprising the Internet page;
designating a first area of the Internet page based on a touch input applied on the touch screen on which the Internet page is displayed, wherein an image corresponding to the first area of the Internet page is captured and a URL (Uniform Resource Locator) related to the image is determined based on the designation of the first area of the Internet page;
displaying a second window on the touch screen which is different from the first window, and the second window comprises a plurality of screen areas divided based on a predetermined format and includes a screen area in which the image is displayed, wherein a size of the image on the screen area is magnified or reduced to fit a size of the screen area; and
executing a function to access an Internet page corresponding to the URL when a control command is received via the touch screen displaying the image, and wherein the Internet page corresponding to the URL is displayed on the touch screen by executing the function.

14. The method of claim 13, wherein one or more other images, each corresponding to one or more other designated area of at least one another Internet pages, is displayed on one or more other screen areas, and
wherein the one or more other screen areas is different from the screen area and comprised in the second window.

15. The method of claim 14, wherein the image and the one or more other images are displayed on the second window without overlapping each other.

16. The method of claim 13, wherein the URL is a common URL for all items included in a content corresponding to the image selected by the touch input.

17. The method of claim 13, wherein the touch input for designating the first area of the Internet page is a drag touch input,
wherein an inner part of a quadrangle defined by the drag touch input is designated as the first area of the Internet page, and
wherein the quadrangle comprises a left upper end apex corresponding to a start point of the drag touch input and a right lower end apex corresponding to an end point of the drag touch input.

18. The method of claim 13, wherein the Internet page corresponding to the URL is displayed on the touch screen via a new window on the touch screen.

19. The method of claim 13, wherein information comprising the image is stored in a format of an electronic document.

20. The method of claim 19, wherein the electronic document corresponding to the information comprising the image is transmitted to a different terminal.

* * * * *